United States Patent Office

3,509,024
Patented Apr. 28, 1970

3,509,024
ASPERGILLOPEPTIDASE FOR USE IN THERAPY AND A PROCESS FOR THE PREPARATION THEREOF
Jörg H. Jürgens, Buchschlag, near Frankfurt am Main, Germany, and Axel Fredrik Valdemar Eriksson and Per Olof Svärd, Sodertalje, Sweden, assignors to Aktiebolaget Astra, Sodertalje, Sweden, a company of Sweden
Filed Aug. 26, 1966, Ser. No. 575,406
Claims priority, application Sweden, Aug. 27, 1965, 11,191/65
Int. Cl. C07g 7/028
U.S. Cl. 195—66                                    6 Claims

ABSTRACT OF THE DISCLOSURE

Therapeutically motive aspergillopeptidase useful in preventing the formation of thrombi and embodi is obtained from the culture fluid of *Aspergillus oryzae*. The enzyme does not hydrolyze N-α-tosyl-L-arginine ethyl ester and N-acetyl-L-tyrosine ethyl ester.

---

Figure 1:
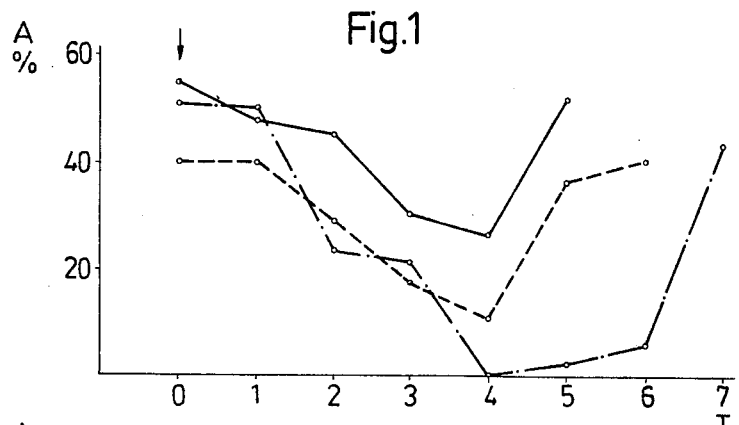

The present invention relates to a new aspergillopeptidase capable of reducing the adhesiveness and aggregation of blood platelets and a method for the prevention of the formation of thrombi and emboli, pharmaceutical preparations used therefore as well as a process for the production of such peptidase and preparations.

A thrombus may be characterized as a plug or clot in a blood vessel or in one of the cavities of the heart remaining at the site of its formation. In case it is caught by the blood stream and brought to a distant vessel, where it may be forced into and become stuck in a smaller one so as to obstruct the circulation, one speaks of an ambolus. The mechanism of the formation of thrombic is complex in nature and involves primarily aggregation and adherance of the blood platelets (thrombocytes), and secondarily plasma coagulation, and also other factors. Most scientists agree that a primary cause of the formation of thrombi and emboli is to be found in a disturbance of the functional behavious of the blood platelets and in an increased tendency for their aggregation (see for example Hellem, A. and Owren, P. A., Acta Haematologica 31 (1964), 230; leading article, Laucet 2 (1964), 295).

After adherance to tissue cells or collagen fibres or aggregation the platelets undergo structural changes, "viscous metamorphosis," and form a "white head," which constitutes the nucleus of the thrombus.

Considerable efforts have therefore in recent years been made to elucidate the mechanism of platelet adhesion and aggregation. Many agents have been found that can induce aggregation, thrombin and adenosine-diphosphate (ADP) having been studied most. Substances have been found which used in vitro and/or in vivo systems inhibit platelet adhesion and aggregation. Thus, there are claims that nialamid in some special circumstances is effective, but these have not been confirmed. Platelets can also be rendered non-adhesive to surfaces and to each other by adding cocaine, but the high concentration of cocaine which is required is lethal to the intact animal. Adenosine or adenosine monophosphate (AMP) inhibits platelet adhesion and aggregation but would be rapidly removed if injected into the blood stream. Therapeutically tolerable doses of phentolamine had no demonstrable effect on platelets or on the bleeding time. Macromolecules such as Dextran and low molecular weight Polybrene also interfere with platelet adhesion and aggregation. Mono-iodo-acetate, after half an hour, also renders platelets non-adhesive. Clearly, none of these methods is clinically practicable. (O'Brien, J. R., editorial article. Blood 23 (1964), 309).

The use of anticoagulants such as heparine or cumarine derivatives blocks the secondary process—plasma coagulation, but the adhesiveness and aggregation of platelets is not affected thereby. Even heparine, which is the most powerful anticoagulant, does not counteract the adhesion to glass, or the aggregation caused by ADP. Thus, in the prevention of thrombotic occlusions particularly also coronary thrombosis, it is more important to prevent platelet aggregation than blood coagulation.

An increased aggregation with an increased liability to formation of thrombi and emboli has been found in many different kinds of illnesses as well as after major surgery and partus, and a compound that could reduce an abnormally high platelet aggregation must be considered as being of great practical value. No such clinically effective drug has yet been available.

An object of the present invention is therefore to provide a substance or preparation capable of preventing the formation of thrombi and emboli by reducing the adhesiveness and the aggregation of blood platelets.

A further object of the invention is to provide a method for preventing the formation of thrombi and emboli in animals, including humans.

Another object is to provide pharmaceutical preparations useful in the treatment of animals, including humans, for preventing the formation of thrombi and emboli. Still another object is to provide a process for the production of such a substance or such preparations.

According to the present invention these objects are obtained by the use of a hitherto unknown aspergillopeptidase to be described hereinbelow.

The preparation, isolation and characterization of an aspergillopeptidase, called Protease I, has been described by Bergkvist. (Bergkvist, R., Acta Chem. Scand. 17 (1963), 1521, 1541, 2230 and 2239). This enzyme was claimed to be a uniform protein that may be used to dissolve blood clots by its fibrinolytic activity. It was considered that this enzyme did not substantially affect the components of blood or plasma. However, is is not capable of reducing the adhesiveness and preventing the aggregation of blood platelets. It has now been found that the method described by Bergkvist can be modified so as to obtain an enzyme preparation which, unlike said Protease I is capable of reducing the adhesiveness and preventing the aggregation of blood platelets, and thereby preventing the formation of thrombi. This new enzyme may be obtained by treating a protease mixture precipitated from the culture fluid of *Aspergillus oryzae* (Bergkvist loc. cit. p. 1537) with tannin and adsorbing the redissolved product on CM-cellulose at pH 5.5 but eluting with 0.005 M ammonium acetate buffer pH 7.5 instead of phosphate buffer. For convenience sake the dry powder preparation of this eluate will hereinafter be referred to as Enzyme Mixture A. The Enzyme Mixture A exerts its effect at concentrations below the level of the physiologically occurring enzyme inhibition for Protease I. At the concentration in question no free fibrinolytic effect is present and no harmful effect on the intrinsic coagulation system of the blood has been found. The clinical tolerance of Enzyme Mixture A is excellent under these conditions.

In view of the antiadhesive and antiaggregation properties of the novel enzyme preparation further chemical experiments were carried out and by immunological techniques—immunodiffusion and immunelectrophoresis—the enzyme preparation was found to be a mixture which was separted into components, one of which, called Aspergillopeptidase ARL 1, was responsible for the effect on blood platelets whereas the other components were virtually free of this effect. This new enzyme may also be isolated from other aspergillopeptidase preparations.

The Aspergillopeptidase ARL 1 according to the invention has been found to possess such properties indicating a definite chemical composition, but slight variations may possibly exist. It is characterized in the following properties:

(a) being a protein of uniform composition;
(b) being readily soluble in water, saline solution and conventional buffered solutions;
(c) being stable and retaining its enzymatic activity at room temperature for more than a year in dry powder form;
(d) being stable in about neutral aqueous solution at 4° C., practically without losing its enzymatic activity, for more than two months;
(e) being stable in about neutral aqueous solution at 37° C., practically without losing its enzymatic acivity, for more than 24 hours;
(f) having an ultraviolet absorption spectrum characteristic of proteins containing aromatic amino acids;
(g) being proteolytically active against casein, hemoglobin and fibrin;
(h) having a proteolytic optimum with hemoglobin at pH 5.0–5.5;
(i) not being able to hydrolyze Na-tosyl-L-arginine ethyl ester and N-acetyl-L-tyrosine ethyl ester;
(j) being able to reduce the adhesiveness and aggregation of blood platelets;
(k) being adsorbed on carboxymethylcellulose at pH 5.5;
(l) being eluted therefrom by an ammonium acetate solution buffered at pH 7.5 and having a molarity higher than 0.005 and preferably equal to or higher than 0.01 to 0.10;
(m) being retarded during chromatography by Amberlite® CG:50 II equilibrated and eluted with 0.01 molar phosphate buffer pH 7.5;
(n) passing a hydroxylapatite column equilibrated and eluted with 0.001 molar phosphate buffer pH 6.80 without any significant adsorption;
(o) being retarded during gel filtration through Sephadex® G:50 F so as to appear in the elution liquid with its maximum at about a third of the difference in volume of elution liquid for glucose and that for dextran of a molecular weight of $5.10^5$, (cfr. Example 3);
(p) having a molecular weight estimated by gel filtration lower than that of the aspergillopeptidase Protease I, which has a molecular weight of 20,000–30,000 determined by ultracentrifugation.

The process for the production of pharmaceutical preparations useful in the treatment of animals, including humans, for preventing the formation of thrombi and emboli comprises the following steps:

(a) applying a possibly prepurified solution of aspergillopeptidases to a weekly acidic ion exchanger at an pH between 4–6, and
(b) eluting the adsorbed enzymes with a solution buffered to a pH of 6–8, and
(c) submitting the enzyme mixture thus obtained to a further purification through gel filtration, fractional precipitation, absorption chromatography, ion exchange chromatography electrophoresis or dialysis or a combination of such procedures, until there is obtained preparation of Aspergillopeptidase ARL 1 which upon dissolving in or possibly after drying and redissolving in an injectable medium gives a solution by which a single dose of 0.1 to 10 mg., such as 0.5 to 7 mg., preferably 1 to 4 mg., of Aspergillopeptidase ARL 1 can be admiinstered. As solvent medium water is generally preferred and it may be made isotonic by the addition of for instance sodium chloride, glucose or levulose. In cases where there are indications for using other drugs these may be added to the injectable solutions provided that they are compatible. In carrying out the above steps the particular operating conditions must, of course, be so chosen—as will be evident to the operator skilled in the art—with respect to the properties and characteristics of the Aspergillopeptidase ARL 1, as to promote the enrichment or isolation thereof.

In the Enzyme Mixtures A referred to in the examples the amount of the new enzyme was found to be about 1% by weight calculated on dry powder. Preparations considerably richer in Aspergillopeptidase ARL 1 may be obtained, if a crude, tannin or lignin precipitated protease mixture from the culture fluid of *Aspergillus oryzae* (see Bergkvist, R. loc. cit.) is treated with CM-cellulose at pH 5.5 and the subsequent elution is made with buffers of concentrations successively increasing from molarities of, for instance, about 0.005 or lower up to molarities of 0.01 to 0.1 (which latter are higher than those used by Bergkvist). The most favourable results are obtained with a CM-cellulose which contains 0.7 to 0.9 milliequivalent of carboxylic groups per gram of carboxymethyl cellulose. The richness in ARL 1 can be varied by varying the pH at which the enzymes are adsorbed on the CM-cellulose. It is further possible to use certain synthetic ion exchangers, such as those based on polystyrene or polyacrylamide, instead of CM-cellulose in order to increase the proportion of Aspergillopeptidase ARL 1.

The new enzyme according to the invention passes through a calcium phosphate column at pH 6.80 and using a phosphate buffer concentration of 0.001 M, without significant adsorption. This behavior is typical for small molecules such as peptides and for neutral and some basic molecules (Tiselius, A. et al., Arch, Biochem. & Biophys. 65 (1956) 132). Aspergillopeptidase ARL 1 is adsorbed by weakly acidic ion exchanger such as Amberlite® CG:50 II in the presence of 0.01 M phosphate buffer at pH 7.5. Compared to the main component (Protease I) of Enzyme Mixture A. Aspergillopeptidase ARL 1 is more strongly adsorbed to both synthetic and cellulose derived acidic ion exchangers.

Aspergillopeptidase ARL 1 is retarded more than the other components of Enzyme Mixture A when eluted from a column of cross linked gel filtration materials by chromatography on, for instance, Sephadex® (G:50, G:75 or G:100) columns. It has been found possible to separate completely the Protease I from Aspergillopeptidase ARL 1. It can be concluded from this retardation that the molecular weight of Aspergillopeptidase ARL 1 is lower than about 20,000–30,000, which is the molecular weight determined by ultra-centrifiguration for Protease I. Furthermore, it has been found that Aspergillopeptidase ARL 1 is retarded on Sephadex G:50 Fine to about 30 perecnt of the difference between the elution volume of glucose and that of dextran of a molecular weight of $5 \times 10^5$. This latter gel retards dextran molecules with a molecular weight of less than 8,000–10,000.

In starch gel electrophoresis Aspergillopeptidase ARL 1 migrates as a single broad peak, with a mobility of 2.0 to 2.5 cm. per hour at 35 volts per cm. in a 0.01 M borate buffer of pH 8.9. The mobility of the main peak in Ensyme Mixture A under the same condi.ions was 0.5 to 0.8 cm. The migration in both cases was towards the negative pole.

The activity of Aspergillopeptidase ARL 1 towards casein was determined by the method described by Bergkvist. The casein was buffered with Johnson Lindsay buffer (Bergkvist, R. loc. cit.). At pH 7.4 the hydrolysis was found to be directly proportional to the amount of enzyme present up to 0.3 mg. Aspergillopeptidase ARL 1 in an amount of 0.1 mg. gives after incubation with casein at pH 6.85 for 20 minutes at 37° C. an increase in optical density of 0.170.

The activity of Aspergillopeptidase ARL 1 towards fibrin was demonstrated by the method of Dyer and Kader (Dyer, A. E. and Kadar, D. Blood 23 (1964), 729). This method was also used to test the inhibition by diisopropylflourophosphate. Aspergillopeptidase ARL 1 as well as Protease I, were inhibited. In this respect they resemble enzymes which contain the amino acid serine at their active sites, e.g., trypsin and chymotrypsin.

The pH-optimum for Aspergillopeptidase ARL 1 with hemoglobin as substrate was determined and compared with that of Protease I. $100\gamma$ of Aspergillopeptidase ARL 1 from a stock solution containing 1 mg./ml. was transferred into each of a series of test tubes containing 2 ml. of hemoglobin solution (prepared according to Glick, D.: Methods of Biochemical Analysis II, page 248) with different pH and which also had been equilibrated in a temperature bath at 37° C. After 10 minutes incubation at 37° C. 1 ml. sample was taken out from a tube and added to 4 ml. of 5% solution of trichloroacetic acid as rapidly as possible. After thorough mixing the mixture was allowed to stand at room temperature for 30 minutes before it was centrifiugated. The centrifiugate was then filtered through cotton. The extinction of the clear filtrate was measured on a Zeiss Spectrophotometer at a Wavelength of 280 m$\mu$. The pH-optimum for Aspergillopeptidase ARL 1 was found to be 5.0–5.5 while that of Protease I was about 7.0–7.5.

To test the activity of Aspergillopeptidase ARL 1 towards synthetic substrates, namely N$\alpha$-tosyl-L-arginine ethyl ester and N-acetyl-L-tyrosine ethyl ester, a pH-stat (Radiometer model SBR 2/SBU 1/TTT 1) was used. The experiment was performed at 30° C. and pH 7.4. A 0.05 M solution of NaOH was used as reagent, which corresponds to a sensitivity of 0.25 micromole acid formed per scale division on the recorder. One test solution contained N$\alpha$-tosyl-L-arginine ethyl ester, 0.5 millimole, and enzyme, 0.2 mg., in 10.0 ml. of water, and an other test solution N-acetyl-L-tyrosine ethyl ester, 0.1 millimole, and enzyme, 0.2 mg. in 10.0 ml. of 10% ethanol. No hydrolysis of the compounds could be detected in 10 minutes. It is worth mentioning that the two compounds are good substrates for Protease I.

Aspergillopeptidase ARL 1, which has an UV-spectrum characteristic of proteins containing aromatic amino acids is readily soluble in water, saline solution and buffer solutions. In dry powder form it is stable for more than a year without loss of enzymatic activity, i.e., without losing its properties to prevent adhesion and aggregation of blood platelets. Likewise aqueous solutions are stable at 4° C. for months and at 37° C. for more than 24 hours without loss of enzymatic activity.

The intravenous toxicities of Protease I and Aspergillopeptidase ARL 1 were compared. The $LD_{50}$ in male albino mice was found to be 17.5 mg./kg. and 9.5 mg./kg. body-weight, respetcively.

According to the present knowledge ADP (adenosinodiphosphate) plays a vital role in the mechanism of adhesion and aggregation of platelets and thereby occupies a key position in such processes as thrombosis. This property of ADP can also be demonstrated in vitro with different techniques, some of which are also suited for study of agents interfering with the ADP effect. Thus the influence of the Enzyme Mixture A on the ADP-induced aggregation of rabbit platelets has been studied in two in vitro systems.

In one of the systems washed platelets which had been isolated from the blood by differential centrifugation and suspended in an artificial medium were used. In the other system the platelets were left in their natural milieu—the plasma—after removal of the red blood cells by centrifugation. In both systems aggregation after addition of ADP was recorded as a change in turbidity or optical density and it was observed how previous addition of the aspergilloprotease preparation in vitro modified the ADP-response.

In a third method used, aspergilloprotease instead of being added in vitro was administered to the animal before the collection of blood samples and the preparation of plateletrich plasma. At various times after the injection of the enzyme, the aggregation of platelets in response to added ADP was studied photometrically as above and any change compared to pretreatment values was attributed to the enzyme administered.

With washed platelets of rabbits suspended in buffered saline, ADP with the addition of calcium ions caused an efficient aggregation of the platelets. The time course of the process was followed by readings of the optical density at one minute intervals. It was found that after approximately 10 minutes a maximum aggregation had occurred and no further increase was noted on the prolonged observation. When the values for maximum aggregation at 15 min. (caused by a fixed concentration of calcium and ADP) were compared, it was observed that the previous addition of Enzyme Mixture A preparation in low concentrations ($10^{-1}$–$10^{-5}$ $\mu$g. per mil.) effectively inhibited the ADP-response. This effect displayed a short latent period but once established the inhibition was not further enhanced by longer preincubation. The inhibition of the ADP-induced aggregation was found not to require calcium ions since it could be obtained in a medium containing the efficient calcium-chelator EDTA. As a further characteristic of this inhibiting effect of the enzyme it was observed that, once manifested, the enzyme-treated platelets could be washed repeatedly without materially losing their resistance to added ADP.

When Enzyme Mixture A was added in vitro to unwashed platelets suspended in plasma, it was also possible to demonstrate that this enzyme preparation caused a resistance to subsequent additions of ADP, though the concentrations required were considerably higher than in the above-mentioned test system. The existence of a short latent period in the action of the enzyme was confirmed also in this system.

If Enzyme Mixture A preparation was administered intravenously to the animal its effect on the ADP-induced aggregation of subsequently withdrawn platelet-rich plasma was not observed until 24–48 hours after the administration. The reason for this descrepancy between in vivo and in vitro findings with respect to the latent period is not as yet known. Once manifested, the inhibition of ADP-induced aggregation persisted for three to four days. This could be prolonged by repeated injections of the preparation.

The effect of the enzyme preparation in humans was also studied in 28 patients, some with normal, but most of them with pathologically increased, aggregation values (normal value 37%). The determination of the aggregation consisted in submitting plasma samples to a reproducible aggregation stimulus, for a definite period of time, whereafter the plasma sample was filtered. The number of thrombocytes was counted electronically before and after the procedure. (The procedure is described in detail by Jürgens, J. Life Sciences, 7 (1966) p. 1379–87). The difference gives a measure of the aggregation. The number of aggregated thrombocytes is expressed as percent of the original number and is hereinbelow referred to as aggregation value. The Enzyme Mixture A preparations were given by slow intravenous injection or by intravenous infusion. It was found that the administration of 120–150 mg. of the enzyme preparation always resulted in a distinct reduction of the aggregation of the platelets. In some cases, even a dose of 60 mg., was sufficient to give the desired response. An increase of the dose to 180–200 mg. caused a more longlasting effect. By repeated administrations for example of 150 mg. each 4–6 days, it was possible to obtain low aggregation values for a very long period of time. In these tests the preparation has been very well tolerated without serious side-effects.

When aspergillopeptidases are used in therapy according to the invention for preventing the formation of thrombi and emboli they should be administered by slow intravenous injection or intravenous infusion. When using an enzyme mixture, wherein Aspergillopeptidase ARL 1 is present in an amount of about 1–2% by weight, calculated on dry powder, the dose generally varies between 50 and 200 mg., which dose may be administered each 4–6 days to obtain a prolonged effect. The dosage and the time interval between the administration depend on the response of the patient. Quantitative comparisons between isolated Aspergillopeptidase ARL 1 and enzyme mixtures containing ARL 1 are not completed but ARL 1 displays the desired effect at much lower concentrations than the enzyme mixtures.

The invention will now be described more in detail by examples showing the production and properties of preparations as well as the effects thereof on blood from animals and on injection in man, the latter being also illustrated by diagrams reproduced in the attached drawing, showing the effect of intravenous infusion of the Enzyme Mixture A in human on the spontaneous platelet aggregation A, expressed in percent, as a function of the time T elapsed from the start of the administration, the instants of administration being indicated by arrows.

Figure 2:
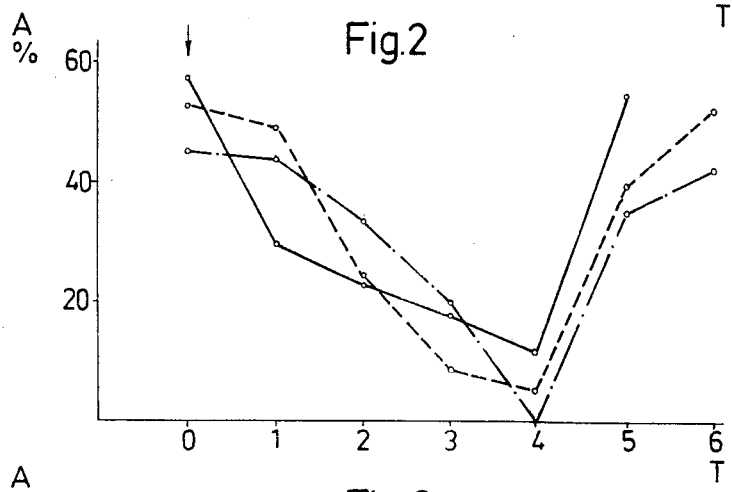
Figure 3:
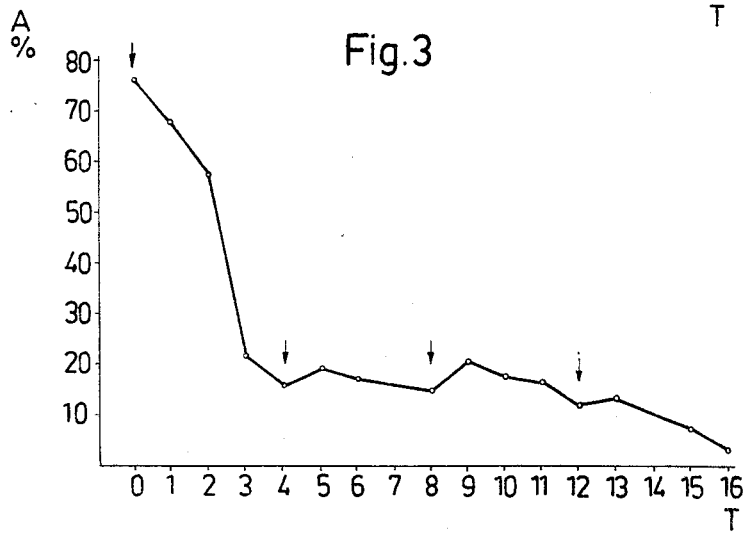

In the drawing:

FIGS. 1 and 2 illustrate the effect of a single intravenous dose of 120 mg. and 150 mg., respectively, of the preparation on three patients, and FIG. 3 illustrates the effect of repeated intravenous doses of 150 mg. of the preparation on one patient.

EXAMPLE 1

85 g. tannin precipitated protease mixture from an *Aspergillus oryzae* culture fluid and 29 g. NaOAc were dissolved in 725 ml. $H_2O$, and the pH adjusted to 6.5 with NaOH. After stirring the suspension for 45 minutes and addition of 8.5 g. dibenzyl ethylene diamine acetate the system was centrifuged. The sediment was washed with 150 ml. $H_2O$ and centrifuged once more. The solutions from the two centrifugations were combined and filtered after addition of 18 g. Celite® as a filtered aid. The filtrate, 990 ml., was dialyzed 17 hours against 85 l. $H_2O$ and thereafter diluted to 1700 ml. After adjustment of the pH of the solution to 5.5 with HOAC, 255 g. CM-cellulose equilibrated with $NH_4OAc$ pH 5.5 were added. The CM-cellulose with adsorbed enzymes was separated and washed three times with 1700 ml. $H_2O$ pH 5.5. The CM-cellulose was consecutively and separately treated with amounts of 640 ml. of each of aqueous solutions of 0.005 M $NH_4OAc$, 0.01 M $NH_4OAc$, 0.01 M $NH_4OAc$ and 0.1 M $NH_4OAc$, each adjusted to pH 7.5. For each treatment the system was filtered with 5 g. Celite® as a filter air. The filtrates were freeze-dried separately. For each treatment a dry powder preparation was obtained with a higher percentage of Aspergillopeptidase ARL 1 than in any of the preceding preparations. The total amount of dry powder, however, decreased each time. In the first obtained preparation Enzyme Mixture A, the concentration of Aspergillopeptidase ARL 1 was about 1%. In the fourth preparation it could vary from 40 to 60%. The total amount of material in the four preparations was approximately 2.6 g., 1.3 g., 0.36 g. and 0.59 g., respectively.

If a phosphate-buffered solution is used instead of an ammonium acetate solution the filtrates must be thoroughly dialyzed before they are freeze-dried, resulting in substantial losses of Aspergillopeptidase ARL 1.

EXAMPLE 2

0.4 g. of a mixture of equal amounts of Aspergillopeptidase ARL 1 and the three Proteases I, II, and III described by Bergkvist (Acta Chem. Scand. 17 (1963), p. 1521) were dissolved in buffer solution and applied to a DEAE-cellulose (diethylamino ethyl cellulose) column (3.9×40 cm.) equilibrated with 0.005 M phosphate buffer at pH 6.0 Elutions were made consecutively with 0.005 M, 0.10 M, 0.25 M, and 0.5 M phosphate buffer solutions. Aspergillopeptidase ARL 1 appeared first but incompletely separated from Protease I when using 0.005 M. buffer. Protease II was eluted with 0.10 buffer and Protease III and 0.15 buffer.

EXAMPLE 3

Four columns of hydroxylapatite with a length of 17 to 20 cm. and a diameter of about 1 cm. were used. (The hydroxylapatite was prepared according to Tiselius, A. et al., Archives of Biochemistry and Biopysics 65 (1956), 132). After the columns had been equilibrated with 0.001 M phosphate buffer pH 6.80, the starting material, 30 mg. of Enzyme Mixture (such as that of Example 1) further treated with DEAE-cellulose at pH 6.0 with 0.025 M ammonium acetate, dissolved in 3 ml. of the buffer, was applied to each column. The elution was made with the buffer and the effluent was collected in fractions of about 3 ml. The extinction of the fractions was determined at the wave length 280 m$\mu$. A peak was obtained just after the void volume of the column. All fractions belonging to this peak were pooled and concentrated in a rotating vacuum evaporator to one fifth of the initial volume. This solution was subsequently applied to a Sephadex G:50 column containing about 27 g. of Sephadex equilibrated with a 0.04 M phosphate buffer pH 6.80. (The void volume of this column determined by means of a blue coloured dextran derivative with a molecular weight of 500,000 was about 40 ml, the elution volume of glucose was about 135 ml.) When the column was eluted with the 0.04 M buffer Aspergillopeptidase ARL 1 appeared at 60 to 80 ml. All fractions were tested for antigenic properties. In a series of tests the amount of Aspergillopeptidase ARL 1 isolated varied from 0.5 to 2.0 percent.

In some cases the gel filtration step was omitted and it was still possible to obtain pure Aspergillopeptidase ARL 1. In such cases the solution was dialyzed before it was applied to hydroxylapatite column with Visking Dialysis Tubing (from Union Carbide International Company). After 16 hours of dialysis the solution was applied to the hydroxylapatite column and treated as described above. Prolonged and more intensive dialysis may reduce the concentration to zero.

Similar results were obtained when a commercial calcium phosphate, for instance Bio-Gel HT (Bio-Rad Laboratories, Richmond, Calif., USA) was used instead of the above hydroxylapatite preparation.

EXAMPLE 4

Two Sephadex G:50 fine columns, both with a cross area of 8 cm.$^2$ and with a length of 47 respectively 93 cm., were equipped with a recording absorptiometers (Uvicords, LKB-Produketer, Sweden). The columns were equilibrated and subsequently eluted with a 0.001 M phosphate buffer pH 6.80, containing 9 g. of NaCl per liter. After the two columns had been connected so that the effluent from the smaller column entered the larger column, 302 mg. of the starting material of Example 3, dissolved in 4.9 ml of the buffer, was applied to the small column. When the first absorptiometer had recorded three "high molecular weight" peaks the two columns were disconnected and the high molecular components were eluted from the larger column as three well separated peaks. The identity of the Aspergillopeptidase ARL 1, being the third peak was established by immunodiffusion technique.

EXAMPLE 5

A tannin precipitated protease mixture from the culture fluid of *Aspergillus oryzae* was treated with CM-cellulose at pH 5.5. A crude mixture was eluted from the CM-cellulose with 0.005 M ammonium acetate buffer pH 7.5. The product is an Enzyme Mixture A (cfr. Example 1). 30 mg. of a dry powder preparation thereof, were dissolved in 3 ml. of the buffer, dialyzed for 16 hours using a Visking Dialysis Tubing, and then applied to a column of hydroxylapatile of the same size as that in Example 3 equilibrated and subsequently eluted with 0.001 M phosphate buffer pH 6.80. At the void volume a small presumable low molecular weight component appeared, immediately followed by Aspergillopeptidase ARL 1.

The enzyme was further purified and deionized by gel filtration on Bio-Gel P–6, 50–150 mesh (Bio-Rad Laboratories).

The column with the dimensions 2×109 cm. was eluted with deionized water at a flow rate of 30 ml./h. The central part of the main peak was collected and lyophilized. A colourless powder was obtained. Yield 1.5%.

In the CM-cellulose above is subsequently eluted with ammonium acetate buffers of higher molarity, 0.01–0.1 M, dry powder preparations with a considerably higher content of Aspergillopeptidase ARL 1 were obtained, although in smaller amounts.

EXAMPLE 6

Example 4 was repeated but for using Enzyme Mixture A instead of the starting material used in that Example 4. The yield was at least equal to that of Example 4.

EXAMPLE 7

A column of Amberlite R CG: 50 II, 200–400 mesh was equilibrated and subsequently eluted with a 0.01 M phosphate buffer pH 7.50. 58 mg. of dry powder preparation of an eluate (obtained by a second elution of the CM-cellulose of Example 5 with 0.01 ammonium acetate buffer, pH 7.5) was dissolved in 1 ml. of 0.01 M phosphate buffer pH 7.50, dialyzed against 500 ml. of this buffer during one day and applied to the column. At an elution volume three to four times that of the void volume Aspergillopeptidase ARL 1 was isolated. It was identified by immunodiffusion technique. The yield was above 30% by weight of the total amount applied.

EXAMPLE 8

1 g. of a tannin precipitated protease mixture from an *Aspergillus oryzae* culture fluid was suspended together with 4 g. of Celite 535 in 10 ml. of a 0.001 M phosphate buffer. The pH was thereby changed to 5.5. This suspension was applied to a hydroxylapatite column which had been equilibrated with a 0.001 M phosphate buffer and the column was thereafter eluted with a phosphate buffer, pH 6.80, of stepwise increased molarity. Only a partial separation was obtained of the components absorbing at 280 m$\mu$. By immunodiffusion technique all fractions containing the Aspergillopeptidase ARL 1 were identified. These fractions were pooled and concentrated in a rotating vacuum evaporator to a volume of 13 ml. The concentrate was applied to a small hydroxylapatite column and rechromatographed. Immediately after a small peak, which was eluted at the void volume with a 0.001 M. phosphate buffer, Aspergillopeptidase ARL 1 followed and was identified by immunodiffusion. The yield was 1.5%.

EXAMPLE 9

The behavior of Aspergillopeptidase ARL 1 (obtained in accordance with Example 5) in gel electrophoresis was studied. The apparatus used is described elsewhere (Mouray H., Maretti J., and Fine J. M., Bull. Soc. Chim. Biol. 43 (1961), 943).

The buffer had the following composition: 1.42 g. of boric acid, 0.37 g. of NaOH per liter of deionized water pH 8.9.

The hydrolyzed starch was a commercial product obtained from Connaught Medical Research Laboratories specially prepared for gel electrophoresis. The concentration of the starch in the gel strips was 15%. The amount of Aspergillopeptidase ARL 1 applied on the electropherogram was 0.5 mg. dissolved in 2.5 $\mu$l. deionized water or buffer. The voltage used was 35 volts per cm. and the time for performing the electrophoresis was 1 hour.

For detecting the proteins after the electrophoresis the strips were immersed in a bath containing: amido black, 0.1 g.; glycerol, 45 ml.; water 45 ml.; and acetic acid, 10 ml. The strips were washed in the glycerol-water-acetic acid mixture for several hours.

The distribution of the proteolytic activity in the electropherogram was obtained by cutting the gel strips in sections 2 mm. wide. The strips were put in test tubes, 3 ml. of 0.2 normal phosphate buffer, pH 6.0 were added whereafter the strips were disrupted in a blender. The proteolytic activity in each tube was determined by the caseinase method. (Bergkvist R., Acta Chem. Scand. 17 (1963), 1521).

The proteolytic activity coincided with the stained area in the electropherogram. Only one stained area could be detected. The distance which Aspergillopeptidase ARL 1 had migrated was found to be between 2.0–2.5 cm. towards the negative pole.

The following experiments will illustrate the method used to study the influence of the aspergillopeptidases on the adhesion and aggregation of blood platelets.

EXAMPLE 10

Blood was obtained from an ether-anesthetized rabbit by a plastic cannula placed in one carotid artery. The blood taken was immediately mixed with 0.075 volume of 0.077 M sodium EDTA adjusted to pH 7.4 in a plastic centrifuge tube. In all subsequent operations siliconized glassware was used. The blood was centrifuged in a refrigerated centrifuge (+5° C.) at 250× g., for 12 min. To remove the red blood cells. The upper ¾ of the supernatant containing the platelets was centrifuged again and the platelets thus sedimented. The sediment was washed by resuspension in a mixture containing 0.154 M sodium chloride, 0.154 M tris-hydrochloride buffer, pH 7.4, and 0.077 M EDTA in the proportions 90:8:2 Centrifugation was repeated for 12 min. at 250× g. The platelets were finally suspended in tris-buffered saline (0.154 M sodium chloride and 0.154 M tris-buffer pH 7.4 in the relation 9:1) to give a platelet count of approximately 500,000 per cu. mm. Such suspensions of platelets were stored in ice for not more than five hours.

For the essay 3.0 ml. of said suspension was added to a siliconized colorimeter tube, which was placed in a Klett-summerson colorimeter Stirring was accomplished by a siliconized glass rod, fitted to a synchronometer operated at 1,000 r.p.m. Readings were made every minute at 620 m$\mu$. A 4.5 minute control run was allowed before any additions were made. To avoid dilution the necessary additions were made in 10 $\mu$l. volumes. Calcium ions were added in the form of a solution of $CaCl_2$ to give a final concentration in the test sample of 1.1 mm. Likewise ADP to a conc. of 8 $\mu$g. ml. was added.

The effect of 0.001, and 0.01 $\mu$g. of Enzyme Mixture A per ml. suspension, given 10 minutes before ADP, was compared with a control sample, where saline was added instead of the enzyme.

The results are compiled below, where the figures represent maximal aggregation 15 minutes after the addition of ADP:

| Addition: | Percent aggregation |
|---|---|
| Control ($Ca^{++}$, ADP) | 61 |
| Enzyme Mixture A, 0.01 $\mu$g., $Ca^{++}$, ADP | 5 |
| Enzyme Mixture A, 0.01 $\mu$g., $Ca^{++}$, ADP | 5 |

EXAMPLE 11

Platelet suspension was prepared as in Example 10. EDTA to a conc. of 1.5 mm. was added to the suspension. Enzyme Mixture A in doses of 0.001, 0.01 and 0.1 $\mu$g. per ml. suspension was incubated with the platelets for 5 min. at room temperature after which time they were sedimented by centrifugation, washed once and resuspended as in Example 10. As control a suspension sample was treated identically except for the omission of the enzyme. Calcium ions and ADP were added 5 min. after the samples were placed in the colorimeter.

| Addition: | Percent aggregation |
|---|---|
| Control (Ca$^{++}$, ADP) | 52 |
| Enzyme Mixture A, 0.001 γ/ml. Ca$^{++}$, ADP | 2 |
| Enzyme Mixture A, 0.01 γ/ml., Ca$^{++}$, ADP | 15 |
| Enzyme Mixture A, 0.1 γ/ml., Ca$^{++}$, ADP | 15 |

EXAMPLE 12

Platelet suspensions were prepared as described in Example 10. Enzyme Mixture A to a conc. of 0.001 μg. per ml. suspension was incubated with the platelets at room temperature for 5 min. After that time different samples were centrifuged and washed (as described in Example 10) 1, 2 and 3 times before final suspension. The effect of calcium ions and ADP was measured. As a control a sample of platelet suspension without enzyme was washed 3 times before assay.

| Treatment: | Percent aggregation |
|---|---|
| Control, washed 3 times (Ca$^{++}$, ADP) | 51 |
| Enzyme Mixture A, 1 wash, Ca$^{++}$, ADP | 20 |
| Enzyme Mixture A, 2 wash, Ca$^{++}$, ADP | 19 |
| Enzyme Mixture A, 3 wash, Ca$^{++}$, ADP | 17 |

EXAMPLE 13

For the preparation of platelet-rich plasma blood was collected as described in Example 10 with the exception that 3.8% trisoduim citrate was used as anticoagulant and was mixed with the blood in the proportions: 1 part citrate to 9 parts of blood. Centrifugation was made at room temperature for 15 min. at 300× g. of the resultant platelet-rich supernatant the upper ¾ was used for the assay. In this system calcium ions need not be added, whereas ADP was used in a final conc. of 8/μg. per ml. plasma. The aggregation was estimated as described in Example 10. Enzyme Mixture A was added to a final concentration of 10, 25 and 50/μg. per ml. plasma 10 min. prior to ADP. The degree of inhibition compared to a control without enzyme was calculated.

| Addition: | Percent inhibition of aggregation |
|---|---|
| Enzyme Mixture A, 10/μg./ml., ADP | 24 |
| Enzyme Mixture A, 25/μg./ml., ADP | 47 |
| Enzyme Mixture A, 50/μg./ml., ADP | 62 |

EXAMPLE 14

Five ml. of blood was taken from a male albino rabbit, weighing 2.2 kg. The blood was mixed with citrate and platelet-rich plasma prepared as in Example 13. The in vitro effect of added ADP on the platelets in the plasma was measured as in Example 11. Thereafter 4.0 mg./kg. of Enzyme Mixture A was infused intravenously and platelet-rich plasma collected at various times after this treatment. The aggregation in vitro after ADP addition was estimated as before.

| | Percent aggregation |
|---|---|
| Before injection | 56 |
| 4 hours after injection | 55 |
| 1 day after injection | 34 |
| 2 days after injection | 39 |
| 3 days after injection | 38 |
| 4 days after injection | 44 |
| 7 days after injection | 59 |

To study the effect over a longer period of time a male albino rabbit, weighing 4.15 kg., was given intravenously 4.0 mg./kg. of Enzyme Mixture A. On the fifth day a second dose of 4.0 mg./kg. of the enzyme was administered.

| | Percent aggregation |
|---|---|
| Before injection | 61 |
| 1 day after injection | 51 |
| 3 days after injection | 40 |
| 4 days after injection | 39 |
| 5 days after injection | 52 |
| Second injection | |
| 6 days after first injection | 40 |
| 7 days after first injection | 20 |

EXAMPLE 15

Platelet suspensions were prepared and the effect of ADP was estimated in Example 10. Aspergillopeptidase ARL 1 was added to the suspension 10 min. prior to ADP.

| Addition: | Percent aggregation |
|---|---|
| Control (Ca$^{++}$, ADP) | 51 |
| Aspergillopeptidase ARL 1, 10$^{-3}$/μg./ml., Ca$^{++}$, ADP | 0 |
| Aspergillopeptidase ARL 1, 10$^{4}$/μg./ml., Ca$^{++}$, ADP | 0 |
| Aspergillopeptidase ARL 1, 10$^{-5}$/μg./ml., Ca$^{++}$, ADP | 0 |
| Aspergillopeptidase ARL 1, 10$^{-6}$/μg./ml., Ca$^{++}$, ADP | 0 |

EXAMPLE 16

Platelet-rich plasma was prepared and the effect of ADP was estimated as described in Example 10. To compare the effectiveness in reducing the aggregation, Aspergillopeptidase ARL 1 and Enzyme Mixture A were added 10 minutes before ADP.

| Addition: | Percent aggregation |
|---|---|
| Control (ADP) | 55 |
| Enzyme Mixture A, 50/μg./ml., ADP | 45 |
| Aspergillopeptidase ARL 1, 2.5/μg./ml., ADP | 29 |
| Aspergillopeptidase ARL 1, 5.0/μg./ml., ADP | 15 |

To illustrate the effect of Aspergillopeptidase ARL 1 in humans the following examples may be given.

EXAMPLE 17

120 mg. of Enzyme Mixture A, in the form of a sterile dry powder, was dissolved in 500 ml. of 5% levulose solution and was administered by intravenous infusion at a constant rate during one hour to a patient, the platelet aggregation value of which had been determined before treatment. After completed infusion the effect on the spontaneous aggregation was followed through studying plasma samples taken at regular intarvals.

In FIG. 1 the result from three patients are given. Before treatment one patient showed a normal and two a pathologically increased aggregation value. In all the cases a marked decrease of the aggregation was observed with maximal reduction on the fourth day after administration.

EXAMPLE 18

In the same manner as described in Example 17, 150 mg. of Enzyme Mixture A was administered and the effect was studied as described earlier. FIG. 2 shows the results from three patients treated with this dose. A significant lowering of the aggregation value was observed.

EXAMPLE 19

A patient with a strongly increased aggregation of the platelets, who therefore was considered to run the risk of having a thrombus or embolus was treated as described in Example 17 with repeated doses of 150 mg. whereafter the effect on the aggregation was determined.

The results are shown in FIG. 3. A marked reduction of the aggregation is observed already after administration of the first dose and it is also shown that it is possible by administering new doses to maintain the aggregation at a low level without fluctuations for a long time.

We claim:

1. A process for producing a therapeutically active aspergillopeptidase, Aspergillopeptidase ARL 1, which does not hydrolyze N-α-tosyl-L-arginine ethyl ester and N-acetyl-L-tyrosine ethyl ester, comprising the steps:
  (a) dissolving in water a protease mixture precipated by tannin from the culture fluid of *Aspergillus oryzae*;
  (b) adjusting the pH of the resulting aqueous solution to about 4–6;
  (c) adsorbing dissolved material on carboxymethylcellulose; and
  (d) eluting adsorbed material with a 0.005–0.100 M ammonium acetate buffer at about pH 7.5.

2. A process according to claim 1 wherein the pH of the aqueous solution is adjusted to about 5.5 and the ammonium acetate buffer is 0.005 M.

3. A process according to claim 1, characterized in using carboxymethylcellulose containing 0.7–0.9 milliequivalents of carboxyl groups per gram of carboxymethylcellulose as adsorbent.

4. A process according to claim 1, in which a mixture of peptidases enriched in Aspergillopeptidase ARL 1 by treatment with an ion exchanger is contracted with a phosphate buffered hydroxylapatite column, whereby in said mixture occurring aspergillopeptidases other than Aspergillopeptidase ARL 1, and other proteins, are adsorbed stronger than Aspergillopeptidase ARL 1, whereby a solution enriched in Aspergillopeptidase ARL 1 is obtained.

5. A process according to claim 1, in which the solution enriched in Aspergillopeptidase ARL 1 by treatment with ion exchanger is further enriched by starch gel electrophoresis.

6. A process according to claim 1, in which the pH of the adsorbent at the adsorption and the ionic strength and pH of the elution liquid are adjusted to give at least 1 percent by weight of Aspergillopeptidase ARL 1 in the mixture of aspergillopeptidases obtained.

References Cited

UNITED STATES PATENTS 3,281,331  10/1966  Bergkvist _____ 195—66

OTHER REFERENCES

Bergkvist: Acta Chemica Scandinavia, vol. 17 (1963), pp. 1521 to 1551 and 2230–2239.

LIONEL M. SHAPIRO, Primary Examiner